(12) United States Patent
Smokvina et al.

(10) Patent No.: US 12,551,516 B2
(45) Date of Patent: Feb. 17, 2026

(54) COMPOSITION FOR AMELIORATION OF ANXIETY AND/OR STRESS

(71) Applicant: COMPAGNIE GERVAIS DANONE, Paris (FR)

(72) Inventors: Tamara Smokvina, Orsay (FR); Raphaël Moriez, Igny (FR); Jan Tack, Leuven (BE); Lukas Van Oudenhove, Leuven (BE); Tim Vanuytsel, Leuven (BE); Lucas Wauters, Leuven (BE)

(73) Assignee: COMPAGNIE GERVAIS DANONE, Paris (FR)

( * ) Notice: Subject to any disclaimer, the term of this patent is extended or adjusted under 35 U.S.C. 154(b) by 420 days.

(21) Appl. No.: 17/596,514

(22) PCT Filed: Jun. 12, 2020

(86) PCT No.: PCT/IB2020/000530
§ 371 (c)(1),
(2) Date: Dec. 13, 2021

(87) PCT Pub. No.: WO2020/250040
PCT Pub. Date: Dec. 17, 2020

(65) Prior Publication Data
US 2022/0241357 A1 Aug. 4, 2022

Related U.S. Application Data

(60) Provisional application No. 62/861,573, filed on Jun. 14, 2019.

(51) Int. Cl.
*A61K 35/747* (2015.01)
*A61P 25/22* (2006.01)

(52) U.S. Cl.
CPC ............ *A61K 35/747* (2013.01); *A61P 25/22* (2018.01)

(58) Field of Classification Search
CPC .............................. A61K 35/747; A61P 25/22
See application file for complete search history.

(56) References Cited

U.S. PATENT DOCUMENTS

| 11,439,674 B2 * | 9/2022 | Slykerman | ............... A61P 25/24 |
| 2017/0028000 A1 * | 2/2017 | Grompone | ............... A61P 31/00 |
| 2020/0188454 A1 * | 6/2020 | Slykerman | ........... A61K 35/747 |

FOREIGN PATENT DOCUMENTS

| WO | 2011/083354 A1 | 7/2011 |
| WO | 2013/155468 A2 | 10/2013 |

OTHER PUBLICATIONS

Bouayed J, Rammal H, Soulimani R. Oxidative stress and anxiety: relationship and cellular pathways. Oxid Med Cell Longev. Apr.-Jun. 2009;2(2):63-7. doi: 10.4161/oxim.2.2.7944. PMID: 20357926; PMCID: PMC2763246. (Year: 2009).*

Grom Pone et al, "Anti-Inflammatory Lactobacillus rhamnosus CNCM I-3690 Strain Protects against Oxidative Stress and Increases Lifespan in Caenorhabditis elegans", PLOS ONE, vol. 7, No. 12, Dec. 26, 2012, p. e52493.

Mcvey Neufeld et al, "Mouse Strain Affects Behavioral and Neuroendocrine Stress Responses Following Administration of Probiotic Lactobacillus rhamnosus JB-1 or Traditional Antidepressant Fluoxetine", Frontiers in Neuroscience, vol. 12, May 8, 2018.

Slykerman et al, "Effect of Lactobacillus rhamnosus HN001 in Pregnancy on Postpartum Symptoms of Depression and Anxiety: a Randomised Double-blind Placebo-controlled Trial", EBIOMEDICINE, vol. 24, Oct. 1, 2017, pp. 159-165.

International Search Report and Written Opinion mailed Oct. 2, 2020 in PCT Application No. PCT/IB2020/000530.

* cited by examiner

*Primary Examiner* — Louise W Humphrey
*Assistant Examiner* — Rachel Emily Martin
(74) *Attorney, Agent, or Firm* — ArentFox Schiff LLP

(57) ABSTRACT

The present invention relates to a composition comprising *L. rhamnosus* CNCM I-3690 for use in prevention, amelioration or treatment of anxiety and/or psychological stress in an individual.

8 Claims, 4 Drawing Sheets

COMPOSITION FOR AMELIORATION OF ANXIETY AND/OR STRESS

CROSS-REFERENCE TO RELATED APPLICATIONS

This application is a National Phase of PCT Application No. PCT/IB2020/000530, filed Jun. 12, 2020, which claims the benefit of U.S. Provisional Application No. 62/861,573, filed Jun. 14, 2019, the disclosures of each of which are hereby incorporated by reference in their entireties.

FIELD OF THE INVENTION

The present invention relates to a composition for use in prevention, amelioration or treatment of anxiety and/or psychological stress in an individual.

TECHNICAL BACKGROUND

According to a definition approved by a joint Food and Agriculture Organization of the United Nations/World Health Organization (FAO/WHO) expert Consultation on Health and Nutritional properties of powder milk with live lactic acid bacteria in 2001, probiotics are "live microorganisms which when administered in adequate amounts confer a health benefit on the host". Probiotic bacteria have been described among species belonging to the genera *Lactobacillus, Bifidobacterium, Streptococcus* and *Lactococcus*, commonly used in the dairy industry. Probiotics are thought to intervene at the level of the gut microbiota by impeding the development of pathogenic microorganisms and/or by acting more directly on the immune system.

*Lactobacillus rhamnosus* is a bacterial species having "Generally Recognized as Safe" (GRAS) status given by FDA and "Qualify Presumption of Safety" (QPS) status recommended by the European Food Safety Agency (EFSA, 2013). *L. rhamnosus* CNCM I-3690 has been studied in different animal models as a single strain to investigate its beneficial effects including anti-oxidant (WO2011083354), metabolic (WO2014071633) and microbiota (WO201515924). It has been associated with immunomodulatory, anti-pathogen (WO2009/122042) and epithelial gut barrier integrity mechanisms.

Probiotic species have been investigated for their beneficial effects on a wide range of diseases and conditions, including anxiety and stress. Pre-clinical studies on rat and mouse models indicate purported anxiolytic properties of *L. rhamnosus* strains HN001, R0011, LGG & JB-1. However, clinical trials in humans of these strains has failed to fulfill their pre-clinical promise as they either failed to confirm the effects of strains in humans, e.g. JB-1: Kelly et. al. Brain, Behavior, and Immunity 61 (2017) 50-59, HN001 Slykerman et al. Acta Paediatr. 2018 December; 107(12):2172-2178 or established effects after extremely long-term consumption e.g. HN001 consumed for about a year Slykerman et al. EBioMedicine. 2017 October; 24:159-165.

Accordingly, there is a need to find means of prevention, amelioration or treatment of anxiety and/or psychological stress by means of probiotics that is effective in humans and where these benefits can be achieved by a feasible dosage regimen.

SUMMARY OF THE INVENTION

The present invention arises from the unexpected discovery, by the present inventors, that oral administration of *L. rhamnosus* CNCM I-3690 reduced anxiety and psychological stress in individuals.

Thus, the present invention relates to a composition comprising *L. rhamnosus* CNCM I-3690 for use in prevention, amelioration or treatment of anxiety and/or psychological stress, preferably self-perceived psychological stress in an individual.

The present invention also relates to the use, in particular the non-therapeutic use, of a composition comprising *L. rhamnosus* CNCM I-3690 for prevention, amelioration or treatment of anxiety and/or psychological stress, preferably self-perceived psychological stress in an individual.

As used herein, the term "dietary supplement" shall be taken to mean a product that is intended to be ingested in addition to the normal diet of a subject for nutritional purposes and/or to provide health benefits such as the prevention or treatment of diseases or disorders.

As used herein, the term "probiotic supplement" shall be taken to mean a dietary supplement comprising probiotic species for the purposes of dietary probiotic supplementation.

As intended herein, the expression "x % (w/w)" is considered equivalent to "x g per 100 g".

As used herein the term "at least" also includes the starting point of the open range. For example, an amount of "at least 95.00% w/w" means any amount equal to 95.00 percentage by weight or above.

As used herein the term "about" defines a range of plus or minus 10% of the cited value. For example, an amount of "about 20 weight %" means any amount within the range of 18 to 22 weight %.

As intended herein the term "dairy composition" relates to a milk-based composition suitable for animal consumption, in particular human consumption.

DETAILED DESCRIPTION OF THE INVENTION

The present invention provides *L. rhamnosus* CNCM I-3690 for use in prevention, amelioration or treatment of anxiety and/or psychological stress, preferably self-perceived psychological stress in an individual.

Accordingly, in one embodiment, the present invention provides a composition comprising *L. rhamnosus* CNCM I-3690 for use in prevention, amelioration or treatment of anxiety and/or psychological stress, preferably self-perceived psychological stress in an individual.

Individual

The "individual" according to the invention is preferably a human. The individual according to the invention may suffer from a disease or disorder such as a recognized anxiety disorder. However, it is preferred that the individual according to the invention does not suffer from such a disease or disorder. In a particular embodiment of the invention, the individual is considered as being part of the general population or healthy.

In embodiments, said individuals have above-normal or excessive levels of cortisol, anxiety and/or psychological stress, in particular, self-perceived psychological stress.

"Above-normal" or "excessive" shall be understood as above the mean of a random population of individuals. In embodiments of the invention, it is preferred that said individuals are within the top 10 percentile (>P90) of cortisol, anxiety and/or psychological stress of a random population of individuals as measured at baseline or during stress-inducing events.

In embodiments, it is particularly preferred that said individuals having above-normal or excessive levels of cortisol, anxiety and/or psychological stress, have cortisol levels during stress-inducing event that is within the top 10 percentile of cortisol as measured at baseline of a random population of individuals. Baseline shall refer to a period of average, normal or routine stress or absence of stress-inducing events.

In embodiments, the cut-off is above 7, 8, 9 or 10 ng/ml baseline salivary cortisol, accordingly it is particularly preferred that said individuals have above 7, 8, 9 or 10 ng/ml salivary cortisol levels during stress-inducing events.

Preferably, said stress-inducing event is one that increases mean STAI (State-Trait Anxiety Inventory) to preferably above or equal to 45 STAI in a random population of individuals. Preferably, said stress-inducing event is one that increases mean PSS (Perceived Stress Scale) to preferably above or equal to 10 PSS in a random population of individuals.

Methods for the assessment of stress are known in the art and are preferably questionnaire based, such as State-Trait Anxiety Inventory (STAI), Perceived Stress Scale (PSS), Beck Anxiety Inventory (BAI); Hospital Anxiety and Depression Scale (HADS); Hopkins Symptom Checklist-90 (HSCL-90); Depression Anxiety Stress Scales (DASS); Hamilton Anxiety Rating Scale (HAMA). Particularly preferred according to embodiments of the invention is the State-Trait Anxiety Inventory (STAI).

Methods for the measurement of cortisol are known in the art, particularly preferred are blood serum, urine and/or saliva assays. In particular, a method to determine the level of cortisol is described in Example 1.

In embodiments, the invention provides *L. rhamnosus* CNCM I-3690 for use in prevention, amelioration or treatment of anxiety by reducing or maintaining said at a clinically non-relevant level, preferably less than 45 STAI.

In embodiments, the invention provides *L. rhamnosus* CNCM I-3690 for use in prevention, amelioration or treatment of psychological stress by reducing or maintaining said at a clinically non-relevant level, preferably PSS score of 10 or less.

Composition

The present invention provides a composition comprising *L. rhamnosus* CNCM I-3690 for use in prevention, amelioration or treatment of anxiety and/or psychological stress, preferably self-perceived psychological stress, in an individual.

This strain has been deposited at the Collection Nationale de Cultures de Microorganismes (CNCM) (Institut Pasteur, 25 Rue du Docteur Roux, Paris, France) under the Budapest Treaty on Nov. 19, 2006 under reference number CNCM I-3690. The deposit was made in accordance with the Budapest Treaty on the International Recognition of the Deposit of Microorganisms for the Purposes of Patent Procedure.

In one embodiment, the composition according to the invention comprises at least $10^6$, at least $10^7$, at least $10^8$ or most preferably at least $10^9$ colony forming unit (CFU) of *L. rhamnosus* CNCM I-3690 per gram (g) of composition according to the invention. Preferably also the composition according to the invention comprises up to about $10^{11}$, more preferably at least $10^{10}$ and most preferably at least $10^9$ colony forming unit (CFU) of *L. rhamnosus* CNCM I-3690 per gram (g) of composition according to the invention. In some embodiments, the composition comprises $10^6$, $10^7$, $10^8$, $10^9$, $10^{10}$ or $10^{11}$ colony forming unit (CFU) of *L. rhamnosus* CNCM I-3690 per gram (g) of composition.

The composition according to the invention is suitable for consumption or ingestion, preferably by oral means. Accordingly, the composition comprises or consists essentially of comestible matter. It is particularly preferred that the compositions of the invention are substantially free of pathogenic or toxicogenic matter.

The composition according to the invention may be a pharmaceutical composition, a nutraceutical composition, dietary supplement, probiotic supplement and/or a nutritional composition.

In embodiments, the supplement is in the form of tablets, powder, capsules or any other form usually not associated with food. Where the composition according to the invention is a probiotic or dietary supplement it may also comprise acceptable excipients, flavouring agents, sweeteners, preservatives and/or emulsifiers.

Where the composition according to the invention is a pharmaceutical composition or dietary supplement it may also comprise at least one pharmaceutically acceptable excipient or vehicle.

Nutritional compositions which can be used according to the invention include dairy products, preferably fermented dairy products. The fermented products can be in the form of a liquid or in the form of a dry powder obtained by drying the fermented liquid. Examples of dairy products include fermented milk and or fermented whey in set, stirred or drinkable form, cheese and yogurt.

Nutritional compositions which can be used according to the invention also include plant fermented dairy products, in particular from pulses, nuts, cereals or seeds. In embodiments, the pulses are selected from the group consisting of peas, split peas, field peas, dry peas, lentil, chickpeas, garbanzo bean, konda, navy bean, white navy bean, white pea bean, pea bean, cow pea, horse bean, haricot, pinot bean, mottled bean, small red bean, red Mexican bean, kidney bean, black bean, black turtle bean, cranberry bean, roman bean, speckled sugar bean, lima bean, haba bean, Madagascar bean, green gram, mung bean, green bean, black gram, urad dal, soy and/or lupin. In embodiments, the nuts are selected from the group consisting of almonds, cashews, pecans, macadamias, hazelnuts, pistachio, walnuts or combinations thereof. In embodiments, the cereals are selected from the group consisting of wheat, rye, spelt, barley, oat, millet, sorghum, rice, teff and combinations thereof. In embodiments, the seeds are selected from the group consisting of hemp, pumpkin, quinoa, sesame, tiger nut, flax, chia, sunflower, coconut or combinations thereof. The fermented product can be a fermented vegetable, such as fermented soy, cereals and/or fruits in set, stirred or drinkable forms.

Nutritional compositions which can be used according to the invention also include baby foods, infant milk formulas and infant follow-on formulas. In a preferred embodiment, the fermented product is a fresh product. A fresh product, which has not undergone severe heat treatment steps, has the advantage that the bacterial strains present are in the living form.

Dairy Composition

Preferably, the composition according to the invention is a dairy composition, in particular a fermented dairy composition.

Preferably, the dairy composition according to the invention comprises or derives (in particular by fermentation) from a composition containing from 30 to 100% (w/w) milk, more preferably from 50 to 100% (w/w) milk and even more preferably from 70 to 100% (w/w) milk.

Preferably also, the dairy composition according to the invention comprises or derives (in particular by fermentation) from a composition essentially consisting of milk or consisting only of milk. As intended herein "milk" preferably relates to vegetal or animal milk.

Preferably, the dairy composition according to the invention comprises or derives (in particular by fermentation) from a composition comprising one or both of skimmed or non-skimmed milk. Preferably, said milk or milks may be in liquid, powdered and/or concentrated form. In one embodiment, said milk or milks may be enriched or fortified with further milk components or other nutrients such as but not limited to vitamins, minerals, trace elements or other micronutrients. Preferably, the dairy composition according to the invention is a fermented dairy composition, more preferably a fermented milk composition such as but not limited to a yogurt.

As intended herein, a "fermented dairy composition" is derived from a dairy composition according to the invention by the acidifying action of at least one lactic acid bacterium, which may be comprised in a ferment, inoculant, culture or starter. More preferably, said dairy composition according to the invention is obtained by the acidifying action of at least one, two, three, four, five, six, seven or more lactic acid bacteria strains. Accordingly, the "fermented dairy composition" comprises at least one, two, three, four, five, six, seven or more lactic acid bacteria strains.

The lactic acid bacterium according to the invention preferably belongs to an Aerococcaceae, Carnobacteriaceae, Enterococcaceae, Lactobacillaceae, Leuconostocaceae, Streptococcaceae or Bifidobacteriaceae family and more preferably to an *Aerococcus, Carnobacterium, Enterococcus, Lactobacillus, Lactococcus, Leuconostoc, Oenococcus, Pediococcus, Streptococcus, Tetragenococcus, Vagococcus, Weissella* or *Bifidobacterium* genus.

More preferably, the lactic acid bacterium according to the invention belongs to a *Lactobacillus brevis, Lactobacillus buchneri, Lactobacillus casei, Lactobacillus curvatus, Lactobacillus delbruckei*, in particular *L. delbruckei* supsb. *bulgaricus* or *lactis, Lactobacillus diolivorans, Lactobacillus fermentum, Lactobacillus fructivorans, Lactobacillus helveticus, Lactobacillus hilgardii, Lactobacillus jensenii, Lactobacillus kunkeei, Lactobacillus mali, Lactobacillus nagelii, Lactobacillus paracasei*, in particular *L. paracasei* subsp. *paracasei, Lactobacillus plantarum, Lactobacillus vini, Lactobacillus rhamnosus, Streptococcus thermophilus, Streptococcus lactis, Streptococcus raffinolactis, Streptococcus cremoris, Bifidobacterium adolescentis, Bifidobacterium animalis, Bifidobacterium bifidum, Bifidobacterium breve, Bifidobacterium infantis, Bifidobacterium lactis*, or *Bifidobacterium longum* species.

One or more lactic acid bacteria can be used for obtaining a fermented dairy composition according to the invention. Thus, in a preferred embodiment, a plurality of species of lactic acid bacteria comprising of *Streptococcus thermophilus* and *Lactobacillus delbrueckii* subsp. *bulgaricus* is used for obtaining a fermented dairy composition according to the invention. In a further embodiment, bacteria comprising of *Streptococcus thermophilus, Lactobacillus delbrueckii* subsp. *bulgaricus, Bifidobacterium* and *Lactococcus* are used for obtaining a fermented dairy composition according to the invention. Accordingly, in one embodiment the invention provides a fermented dairy composition comprising of *Streptococcus thermophilus* and *Lactobacillus delbrueckii* subsp. *bulgaricus*, which in a further embodiment may additionally comprise *Bifidobacterium* and *Lactococcus* bacteria.

In a preferred embodiment, the lactic acid bacterium is a probiotic bacterium.

The expressions "fermented milk" and "yogurt" have the usual meanings attributed to them and may in appropriate circumstances be used interchangeably, e.g. a fermented dairy composition comprising *Lactobacillus bulgaricus, Streptococcus thermophilus* and further additional bacteria (e.g. probiotic strains) may be referred to as a "fermented milk" or alternatively as "yogurt".

Methods for the preparation of fermented milk products, such as yogurts or equivalents thereof, are well-known in the art. Typically, a fermented milk product is prepared by culture of heat-treated (e.g. pasteurized) skimmed and/or non-skimmed milks with suitable microorganisms to provide a reduction in pH. The selection of suitable microorganisms (e.g. thermophilic lactic acid bacteria) is within the scope of the skilled person and for the preparation of yogurt will typically include *Lactobacillus bulgaricus* (also referred to as *Lactobacillus delbruckei* subsp. *bulgaricus*) and *Streptococcus thermophilus*, optionally with additional microorganisms such as but not limited to probiotic species or other species that may provide desirable organoleptic qualities to the composition.

The dairy composition, in particular the fermented dairy composition, according to the invention, may optionally further comprises secondary ingredients such as fruits, vegetables, nutritive and non-nutritive sweeteners, cereals, flavours, starch, thickeners, preservatives or stabilizers. Preferably, the dairy composition, in particular the fermented dairy composition, according to the invention shall comprise up to about 30% (w/w) of said secondary ingredients, e.g. up to about 10%, 15%, 20%, 25% (w/w).

Preferably, the dairy composition according to the invention is a fermented dairy composition, more preferably a fermented milk composition that comprises, comprises essentially or consists of milk that has been subjected to heat treatment at least equivalent to pasteurization, preferably said heat treatment is carried out prior to the preparation of the dairy composition or fermented dairy composition.

Preferably, the dairy composition according to the invention is a fermented dairy composition, more preferably a fermented milk composition that comprises above about 0.3 g per 100 g by weight free lactic acid, more preferably the invention provides a fermented milk composition comprising above about 0.7 g or 0.6 g per 100 g by weight free lactic acid. Preferably, the dairy composition according to the invention is a fermented dairy composition, more preferably a fermented milk composition that comprises a protein content at least equivalent to that of the milk or milks from which it is derived.

Preferably, the dairy composition according to the invention is a fermented dairy composition, more preferably a fermented milk composition that has a pH equal to or lower than 5, more preferably between about 3.5 and about 4.5.

Preferably, the dairy composition according to the invention is a fermented dairy composition, more preferably a fermented milk composition that has a viscosity lower than 200 mPa·s, more preferably lower than 100 mPa·s and most preferably lower that 60 mPa·s, at 10° C., at a shear rate of 64 $s^{-1}$. In one embodiment the dairy composition according to the invention is a drinkable fermented dairy composition, more preferably a fermented milk drink such as but not limited to a yogurt drink, kefir etc.

In an alternative embodiment, the dairy composition according to the invention is a fermented dairy composition, more preferably a fermented milk composition that is spoonable. As used herein the term "spoonable" shall be taken to mean a solid or semi-solid that may be consumed by means of a spoon or other utensil.

Preferably also, the dairy composition, in particular the fermented dairy composition, according to the invention, or the product according to the invention, may be stored at a temperature of from 1° C. to 10° C.

A single serving portion of the dairy composition, in particular the fermented dairy composition according to the invention, more preferably a fermented milk composition or the product according to the invention is preferably about 50 g, 60 g, 70 g, 75 g, 80 g, 85 g, 90 g, 95 g, 100 g, 105 g, 110 g, 115 g, 120 g, 125 g, 130 g, 135 g, 140 g, 145 g, 150 g, 200 g, 300 g or 320 g or alternatively about 1 oz, 2 oz, 3 oz, 4 oz, 5 oz, 6 oz or 12 oz by weight.

Preferably, the dairy composition, in particular the fermented dairy composition according to the invention, more preferably a fermented milk composition according to the invention comprises at least $10^6$, more preferably at least $10^7$ and most preferably at least $10^8$ colony forming unit (CFU) of *Lactobacillus bulgaricus* (also referred to as *Lactobacillus delbruckei* subsp. *bulgaricus*) and *Streptococcus thermophilus* per gram (g) of composition according to the invention e.g. at least of $5 \times 10^6$ *Lactobacillus bulgaricus* and $5 \times 10^6$ *Streptococcus thermophilus*. Preferably also the composition according to the invention comprises up to about $10^{11}$, more preferably at least $10^{10}$ and most preferably at least $10^8$ colony forming unit (CFU) of *Lactobacillus bulgaricus* (also referred to as *Lactobacillus delbruckei* subsp. *bulgaricus*) and *Streptococcus thermophilus* bacteria per gram (g) of composition according to the invention.

Methods for the preparation of fermented milk products, such as yogurts or equivalents thereof, are well-known in the art. Typically, a fermented milk product is prepared by culture of heat-treated (e.g. pasteurized) skimmed and/or non-skimmed milks with suitable microorganisms to provide a reduction in pH. The selection of suitable microorganisms (e.g. thermophilic lactic acid bacteria) is within the scope of the skilled person and for the preparation of yogurt will typically include *Lactobacillus bulgaricus* (also referred to as *Lactobacillus delbruckei* subsp. *bulgaricus*) and *Streptococcus thermophilus*, optionally with additional microorganisms such as but not limited to probiotic species and/or other species that may provide desirable organoleptic qualities to the composition. Fermented milk products may be either or set or stirred subsequent to fermentation.

Methods

The present invention also provides a method for prevention, amelioration or treatment of anxiety and/or psychological stress, preferably self-perceived psychological stress in an individual in need thereof, comprising administering an effective amount of a composition comprising *L. rhamnosus* CNCM I-3690 to the individual. In embodiments, the individuals have above-normal or excessive levels of cortisol, anxiety and/or psychological stress, in particular self-perceived psychological stress.

In embodiments, said amount is effective for reducing or maintaining anxiety at a clinically non-relevant level, preferably less than 45 STAI. In alternative embodiments, said amount is effective for reducing or maintaining psychological stress at a clinically non-relevant level, preferably PSS score of 10 or less.

In embodiments, said effective amount comprises a dose of between about $10^8$ and about $10^{14}$ colony forming unit (CFU) of *L. rhamnosus* CNCM I-3690, preferably between about $10^9$ and about $10^{12}$, more preferably about $10^{11}$ colony forming unit (CFU) of *L. rhamnosus* CNCM I-3690.

In further embodiments, the method for prevention, amelioration or treatment of anxiety and/or psychological stress, preferably self-perceived psychological stress, in an individual in need thereof, comprises administering an effective amount of a composition comprising *L. rhamnosus* CNCM I-3690 to the individual in at least 1, 2, 3, or 4 doses provided within a 24 hour time period. It is further preferred that the daily dosage regimen is maintained for at least about 1, 2, 3, 4, 5, 6 or 7 days, or in alternative embodiment for at least about 1, 2, 3, 4, 5, 6 or 7 weeks. In embodiments of the invention, the product is consumed at least 1, 2, 3, 4, 5, 6 or more weeks in advance of a stress-inducing event (e.g. examinations, interviews and suchlike).

Dosage Regimens

In one embodiment, the present invention provides the consumption or administration of a dose of between about $10^8$ and about $10^{14}$ colony forming unit (CFU) of *L. rhamnosus* CNCM I-3690, preferably between about $10^9$ and about $10^{12}$, more preferably about $10^{11}$ colony forming unit (CFU) of *L. rhamnosus* CNCM I-3690.

In a further embodiment, at least 1, 2, 3, or 4 doses are provided within a 24 hour time period. It is further preferred that the daily dosage regimen is maintained for at least about 1, 2, 3, 4, 5, 6 or 7 days, or in alternative embodiment for at least about 1, 2, 3, 4, 5, 6 or 7 weeks. In embodiments of the invention the product is consumed at least 1, 2, 3, 4, 5, 6 or more weeks in advance of a stress-inducing event (e.g. examinations, interviews and suchlike).

Accordingly, in one embodiment, the present invention provides the daily consumption or administration of a serving of a composition of the invention comprising at least 1, 2, 3, or 4 doses of *L. rhamnosus* CNCM I-3690, in particular a pharmaceutical composition, a nutraceutical composition, dietary supplement, probiotic supplement and/or a nutritional composition according to the invention, more preferably a milk composition or fermented milk composition according to the invention. Each serving may be consumed or administered individually, or a plurality of servings may be consumed or administered in a single instance. Each of said servings may be consumed at mealtimes or between mealtimes (e.g. as a snack, subsequent to sporting activities etc. . . . ).

For example, in one embodiment, the present invention provides the daily consumption of at least 2 servings of a 100 g portion of a fermented milk product comprising between about at least $10^9$ colony forming units (CFU) *L. rhamnosus* CNCM I-3690 bacteria per g of product. In a further embodiment, said daily level of consumption is maintained over a period of at least 1, 2, 3, 4, 5, 6 or more weeks. In embodiments of the invention, the product is consumed at least 1, 2, 3, 4, 5, 6 or more weeks in advance of a stress-inducing event (e.g. examinations, interviews and suchlike).

Manufacture

The present invention also relates to the use of *L. rhamnosus* CNCM I-3690 for the manufacture of a composition intended for prevention, amelioration or treatment of anxiety and/or psychological stress, preferably self-perceived psychological stress in an individual.

Kits

In a further embodiment, the present invention provides a kit (i.e., article of manufacture) for the herein disclosed uses of the compositions of the invention, said kit comprising:
 i) A receptacle containing a composition according to the invention comprising *L. rhamnosus* CNCM I-3690, and
 ii) Printed matter disclosing that said compositions may be of use in prevention, amelioration or treatment of anxiety and/or psychological stress, preferably self-perceived psychological stress.

In a preferred embodiment, said composition comprises between about $10^8$ and about $10^{19}$ colony forming unit (CFU) of L. rhamnosus CNCM I-3690, preferably between about $10^8$ and about $10^9$ and more preferably between about $10^9$ and about $10^{10}$ colony forming unit (CFU) of L. rhamnosus CNCM I-3690.

Preferably, the printed matter may be in the form of a label or packaging insert.

The invention will be further illustrated by the following non-limitative Figures and Example.

EXAMPLE 1: REDUCTION OF ORAL EXAM-INDUCED STRESS BY MEANS OF LACTOBACILLUS RHAMNOSUS CNCM I-3690

Introduction

The aim of the study ("ProSPer"; www.clinicaltrials.gov reference NCT03408691) was to determine, in healthy humans, the capacity of a fermented dairy product containing the active ingredient Lactobacillus rhamnosus CNCM I-3690 to decrease the oral exam-induced stress.

Fermented dairy products contain live bacterial cells; some considered as probiotics others called ferments or yogurt symbiosis. These bacteria are present in very high number in fermented products (typically $10^7$-$10^9$ CFU/g) and populate the small intestine when administrated.

The drinkable dairy product, cow's milk fermented by Lactobacillus rhamnosus CNCM I-3690 was tested in healthy students that exposed to the stress related to oral exam for bachelor or master degree graduation. Subjects (students) consumed the dairy product (2×100 ml) or the control during 4 weeks before the exam.

The permeability of the intestinal barrier was assessed using two sugars: lactulose and mannitol by measuring their ratio in urine. Sugars solution were administrated a few minutes before the oral exam and urine sampled two hours after the administration. During the study and for four weeks before the oral exam the level of stress was assessed by measuring the cortisol in saliva samples. In addition, IgA and alpha-amylase in saliva samples was measured.

The investigated product is a non-commercialised product and contains the cow's milk fermented by Lactobacillus rhamnosus CNCM I-3690 at $10^9$ CFU/g of live bacterial cells as well as the main product of the fermentation, lactic acid. The product was compared to a control milk acidified by inorganic acid (ortho-phosphoric).

Methods

Study Design and Procedures

Figure 1:
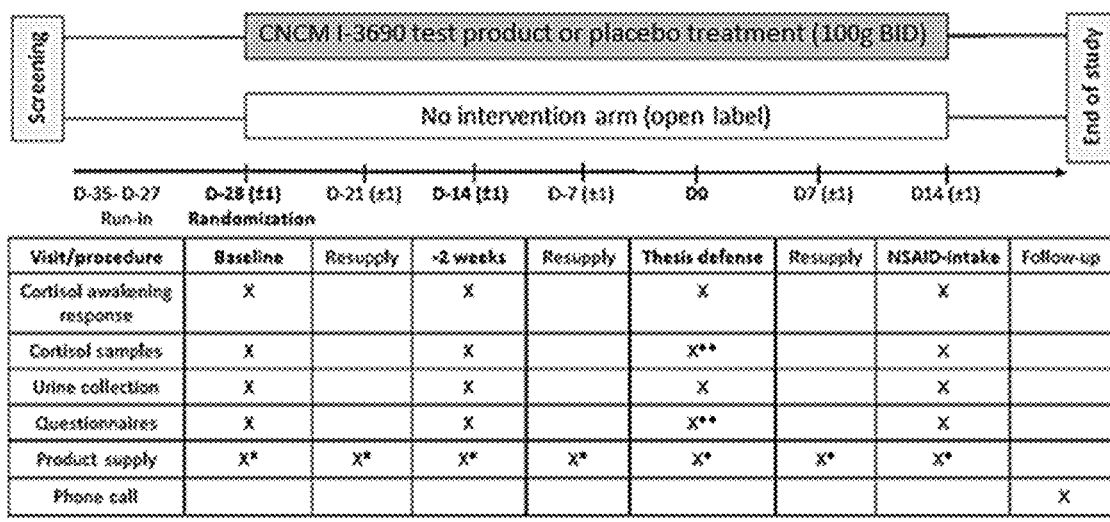
FIG. 1. Study design.

The study design of this single center study with a randomized, controlled and parallel-group design is shown in FIG. 1. One active (CNCM I-3690 test product) and two control groups, control product (placebo) and no-intervention (open label), were included in a 2:2:1 ratio. The open label arm was added to exclude an effect of dairy product in the control intervention arm. All visits were scheduled according to the planned public thesis defense (DO).

Figure 2:
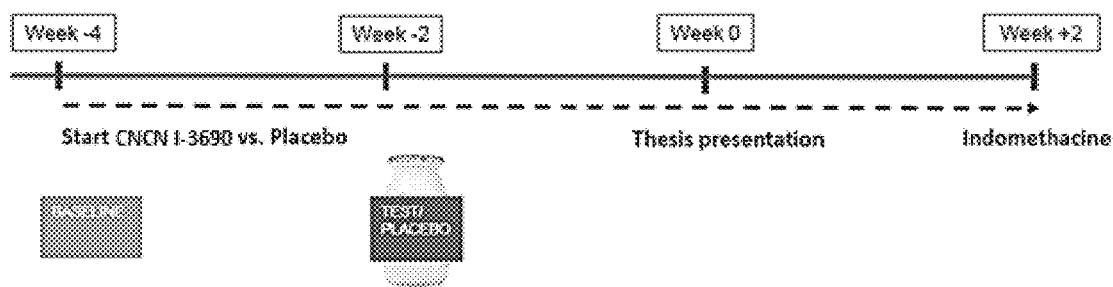
FIG. 2. Overview of the study.

After a screening visit for eligibility, a run-in period of minimum 15 days took place prior to randomization. Healthy students were randomized to the L. rhamnosus fermented milk or placebo (acidified milk) consumed daily (2×100 g) for 4 weeks prior to public speech (oral exam) and 2 more weeks until NSAID-administration (indomethacine 125 mg; positive control) (FIG. 2). In details, a baseline visit >1 month (D-35 to D-27) and second visit 2 weeks before the thesis defense (D-14±1 day) were planned with collection of samples and questionnaires. On the day of the thesis defense (DO), both standard and additional samples and questionnaires were obtained. A final visit was planned 2 weeks after the thesis (D+14±1 day), with routine procedures after intake of indomethacine, a non-steroidal anti-inflammatory drug (NSAID), as a positive control to increase the intestinal permeability, measured with the LMR. This was followed by a safety follow-up phone call after 1 to 2 weeks to check for potential adverse events.

Study Participants

Subjects were healthy female or male students, aged 20 to 30 years old, who were recruited by advertisement from the faculty of (bio-)medical and pharmaceutical sciences or industrial engineering (bachelor or master). Structured medical history and psychiatric screening was performed to exclude chronic GI disorders or psychiatric diseases. A diagnosis of an active medical condition such as diabetes mellitus (type 1 or 2) and/or a first degree relative with type 1 diabetes, celiac or inflammatory bowel disease were exclusionary. Subjects with food allergy or a history of atopic conditions requiring active treatment and known or suspected lactose intolerance were also excluded.

In Vivo Permeability Testing

Small intestinal permeability was quantified by a 2 h lactulose-mannitol ratio (LMR), fractional excretion of mannitol (FEM) and lactulose (FEL) at baseline and after the exam. In details, lactulose and mannitol concentrations were determined by a HPLC-ELSD method (high-performance liquid chromatography with evaporative light scattering detector) in a 2 h-urine collection after ingestion of 5 g of lactulose and 2 g of mannitol in 200 mL of water. Limits of detection were 1 mg/L for lactulose and 1.2 mg/L for mannitol. LMR was determined as the concentration of lactulose divided by mannitol. In addition, the fractional excretion of lactulose (FEL) and mannitol (FEM) were calculated by dividing the amount of lactulose and mannitol excreted in 2 h by 5 g or 2 g, respectively.

Salivary Markers of Objective Stress

Salivary cortisol samples were collected to determine the cortisol awakening response (CAR) and acute levels as markers of the hypothalamic-pituitary-adrenal (HPA) axis-activation. Salivary cortisol was measured at both visits. In addition, Salivary Alpha-Amlyase (SAA) and secretory IgA (sIgA) were measured as markers of the autonomic and immune component of the stress response, respectively.

Psychological Questionnaires

Figure 3:
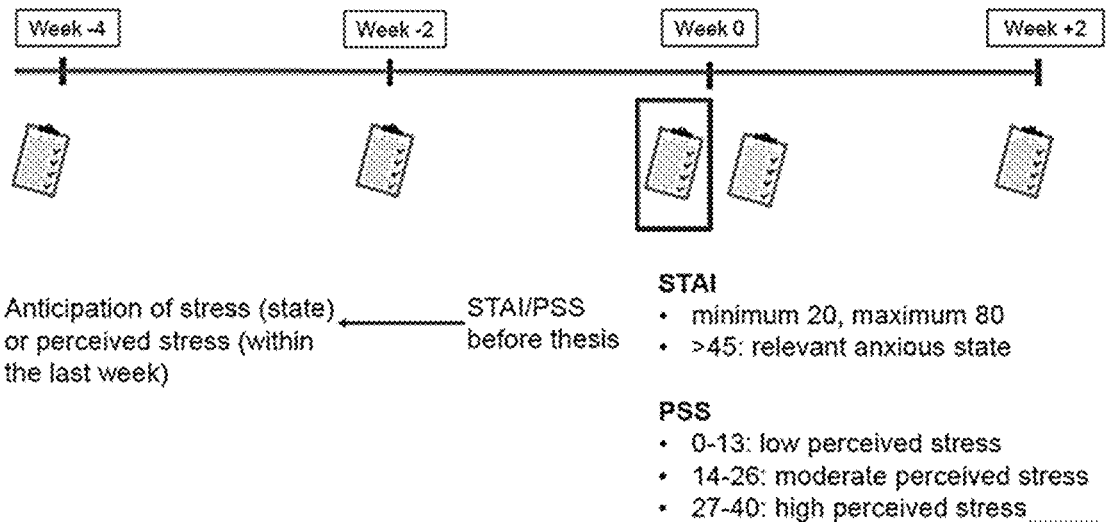
FIG. 3. Overview of the STAI and PSS questionnaires.

Momentary anxiety levels were measured with the state version of the validated State-Trait Anxiety Inventory (STAI) questionnaire at fixed time points. Perceived stress in the preceding week was assessed with the 10-item Perceived Stress Scale (PSS). Both questionnaires were collected before the urine collection on each test day with an additional STAI immediately after the thesis with the clear instruction that the questions pertained to the perception during the thesis presentation (FIG. 3).

Study Outcomes

Primary outcome was the change during stress vs. baseline of LMR between treatment groups. Mixed models with contrasts between groups were applied with correction for multiple testing for secondary endpoints only. Within-group changes were compared to nominal alpha 5%.

Secondary outcomes were the change of LMR after 2 weeks and NSAID vs. baseline, as well as salivary cortisol and STAI during stress vs. baseline within- and between-treatments. Prespecified exploratory outcomes were the change of SAA, sIgA, CAR, FEL, FEM and PSS during stress vs. baseline and CAR after 2 weeks vs. baseline within- and between-treatments.

Randomization and Blinding

Randomization was performed after the baseline visit using an Interactive Web Response System and all study participants and on-site study personnel remained blinded for the treatment, except for the open label arm. Further details are provided in supplementary methods.

Sample Size

A 50% reduction of the stress-induced increase in LMR in the CNCM I-3690 test product compared to control product (placebo) was hypothesized. Using a randomization ratio of 2:2:1 for CNCM I-3690 test product, placebo and open label arm with a type 1 error of 0.05, a total number of 90 evaluable subjects (36;36;18) allowed a power of 0.88. Based on the high number of eligible study participants, the target recruitment number was increased to 120 subjects (48;48;24) to allow a power of 0.95 for a 50% reduction and a power of 83% for 40% reduction of the stress-related permeability defect. The study was not powered to detect differences in the open label arm.

Safety

Subjects were questioned about possible adverse events (AE) at every study visit and during a safety follow-up phone call 1 to 2 weeks after the final visit (earlier if premature termination of the study). AE were graded using the Common Terminology Criteria for Adverse Events (CT-CAE) version 4.0 and reported for all randomized subjects.

Statistical Analysis

Data from the full analysis set, including subjects randomized and exposed to the study product (for the intervention arms), were analysed according to the intention-to-treat principle. Baseline variables were compared with Mann-Whitney U test for continuous data and chi-square test for proportions. Outcome or dependent variables were analyzed using linear mixed models, with test visits (baseline, -2 weeks, thesis and NSAIDs) as within- and treatment (CNCM I-3690 test product or placebo) as between-subject independent variables of interest with their interaction. Effects of interest included the main effect of visit or treatment and the interaction effect. The assumption of normal distribution (based on the Kolmogorov-Smirnov test) was checked for all outcomes, with transformations of the outcome variable to normalize this distribution. The variance-covariance structure providing the best fit was chosen based on the lowest value of the Akaike's information criterion. All data were analyzed in SAS 9.4 (SAS Institute, Cary, USA) and least square means estimates are given as mean±standard error (SE).

Changes in the outcome or dependent variable were assessed between pre-specified visits and compared between treatments as detailed in the "study outcomes" section. No gatekeeping strategies were applied and all comparisons were performed at an alpha level of 5% with the exception of changes in multiple visits for each secondary or exploratory outcome, which were corrected for multiplicity using the stepdown-Holm method. No other adjustments for multiplicity were made. Pre-specified secondary (adjusting for age, gender, study topic and degree), subgroup (subjects with cortisol during stress above the 90th percentile (P90) of baseline) and mediation analyses were performed. Additional and exploratory analyses were done in case the significant main or interactions effects were not explained by pre-specified analyses, with correction for multiple testing. A two-tailed P value <0.05 was considered significant and 0.05<P<0.10 a trend. Results are reported in accordance with 2010 Consolidated Standards of Reporting Trials (CONSORT) guidelines.

Tests Products and Dispensing

The product provided during this study is a chilled drinkable dairy product intended for oral consumption only, formulated with ingredients and food additives authorized for use in food for human consumption: milk, cream, milk powder or water, lactose, ortho-phosphoric acid (E338), and fruit cocktail flavour. The shelf life of the study products is 35 days, stored at 2-8° C.

Products

The test product was a non-commercialized fermented fresh dairy product, containing the strain $L.$ $rhamnosus$ CNCM I-3690 $10^{11}$ CFU/100 g (active ingredient) and the main metabolite of the fermentation, lactic acid. Lactose and fruit cocktail flavour were added.

The test study product was assessed in the study versus the control product which was a non-fermented cow milk acidified with the inorganic acid, ortho-phosphoric acid, not containing bacteria and lactic acid. The study product and the control product were both drinkable, they had similar appearance and taste to preserve the double blind methodology. The study and control products were packaged in identical 100 ml food-grade white pots sealed with an aluminium lid.

The serving size was 80 G/100 ml, consumed twice a day (in the morning and in the evening) during four weeks including the morning before the oral exam. The consumed dose was 2 bottles per day (2×100 ml) one at breakfast and one at dinner. The Products were stored under controlled temperature (+2 to +8° C.) in a fridge till the end of shelf life.

Results

Figure 4:
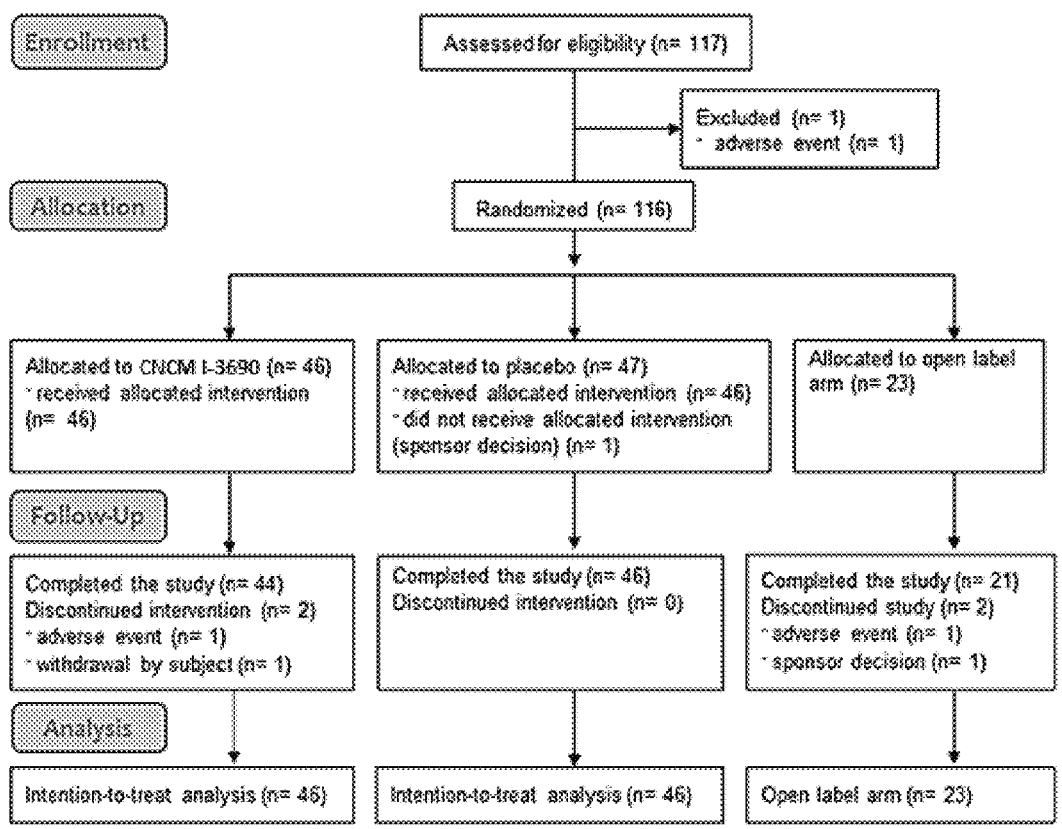
FIG. 4. Patient flow.

From January to July 2018, 117 subjects were included and 116 were randomized after exclusion of 1 subject during run-in (FIG. 4). In total, 92 students (55 females, mean age 23±1.9 years) were included (46 per group). There were no differences in the baseline characteristics (table 1).

TABLE 1

Baseline characteristics of the study population, including the intention-to-treat (test product and placebo treatment) and open label arm. BMI, Body Mass Index; CAR, Cortisol Awakening Response; DIABP, diastolic blood pressure; FEL, Fractional Excretion of Lactulose; FEM, Fractional Excretion of Mannitol; GAD-7, General Anxiety Disorder7-item; HR, heart rate; LMR, Lactulose Mannitol ratio; NA, not applicable; PHQ-9, Patient Health Questionnaire 9-item; PSS, Perceived Stress Scale; SAA, Salivary Alpha Amylase; sIgA, Secretory Immunoglobin A; STAI, State Trait Anxiety Inventory; SYSBP, systolic blood pressure.

| Variable | CNCM I-3690 test product (n = 46) | Placebo (n = 46) | p-value | Open label (n = 23) |
| --- | --- | --- | --- | --- |
| Clinical & demographic | | | | |
| Age (years) | 23.23 ± 0.32 | 22.84 ± 0.28 | .35 | 24.09 ± .61 |
| Female (%) | 26 (56) | 28 (61) | .67 | 19 (83) |
| BMI | 21.97 ± 0.27 | 21.56 ± .35 | .35 | 22.28 ± .43 |
| SYSBP (mmHg) | 123.48 ± 1.05 | 125.24 ± 1.10 | .26 | 123.35 ± 1.71 |
| DIABP (mmHg) | 69.48 ± 1.50 | 70.22 ± 1.52 | .74 | 69.04 ± 2.10 |
| HR (/min) | 65.93 ± 1.51 | 66.93 ± 1.68 | .66 | 66.78 ± 1.92 |
| Master (%) | 25 (54) | 22 (48) | .53 | 12 (52) |
| Biomed Sc (%) | 23 (50) | 30 (65) | .14 | 13 (56) |
| Anxiety & depression | | | | |
| GAD-7 | .91 ± .19 | 1.24 ± .19 | .29 | 1.74 ± .41 |
| PHQ-9 | 1.20 ± .17 | 1.41 ± .22 | .48 | 2.43 ± .48 |
| In vivo permeability | | | | |
| LMR | .03 ± .003 | .03 ± .002 | >.99 | .03 ± .002 |
| FEL (%) | .12 ± .008 | .10 ± .007 | >.99 | .10 ± .01 |
| FEM (%) | 9.54 ± .59 | 9.34 ± .39 | .78 | 10.06 ± 1 |
| Salivary analysis | | | | |
| CAR (ng * min/ml) | 10.30 ± .62 | 10.35 ± .79 | .95 | 11.57 ± .94 |
| Cortisol (ng/ml) | 4.88 ± .45 | 5.81 ± .81 | .34 | 4.73 ± .48 |
| SAA (U/ml) | 102.92 ± 23.45 | 76.44 ± 12.76 | .32 | 68.90 ± 11.62 |
| sigA (µg/ml) | 192.84 ± 18.10 | 164.48 ± 12.16 | .21 | 155.86 ± 14.36 |
| Questionnaires | | | | |
| STAI | 29.80 ± .84 | 28.74 ± .94 | .41 | 32.87 ± 1.66 |
| PSS | 7.89 ± .69 | 7.85 ± .72 | .92 | 10.87 ± 1.21 |
| Product adherence compliance (%) | 99.59 ± .40 | 99.61 ± .29 | >.99 | NA |

No differences between groups were found for LMR (Δ=0.003, 95% CI [−0.005;0.01], p=0.51), FEL or FEM. Within-group analyses showed an increase of FEM during exam vs. baseline for placebo (10.6±3.7% vs. 9.3±2.5%, p=0.02) but not L. rhamnosus (10±4% vs 9.5±3.9%, p=0.23) groups.

Figure 5:
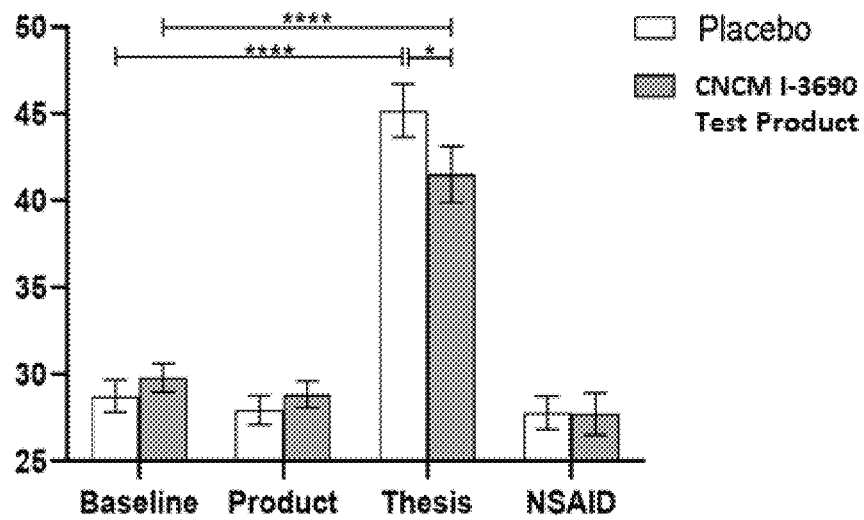
FIG. 5. STAI of study groups.

As shown in FIG. 5, STAI increased during stress vs. baseline for placebo (Δ=16.4, 95% CI [13.5;19.3]) & CNCM I-3690 test product (Δ=11.7, 95% CI [8.8;14.6], p<0.0001) groups. However, a lower increase during stress vs. baseline occurred in CNCM I-3690 test product vs. placebo (Δ=−4.7, 95% CI [−8.8;−0.6], p=0.02).

Similar findings for LMR, FEL & STAI were observed in subjects with cortisol (stress) >P90 cortisol (top 10 percentile of the salivary cortisol measured at baseline). The subgroup analysis of cortisol >P90 refers to those individuals who have a cortisol level above this value at the moment of stress, which was more than 10% of the volunteers. The cut-off value of the P90 of salivary cortisol at baseline (for all subjects in CNCM I-3690 test product and placebo group together) was 9.046 ng/ml. At baseline, 9 subjects had a salivary cortisol of >9.046 (=P90). At stress, 58 subjects had a salivary cortisol of >9.046.

A significant increase in subjects with cortisol (stress) >P90 cortisol (baseline) was observed for FEM during stress vs. baseline and during product intake vs. baseline in placebo but not CNCM I-3690 test product.

Figure 6:
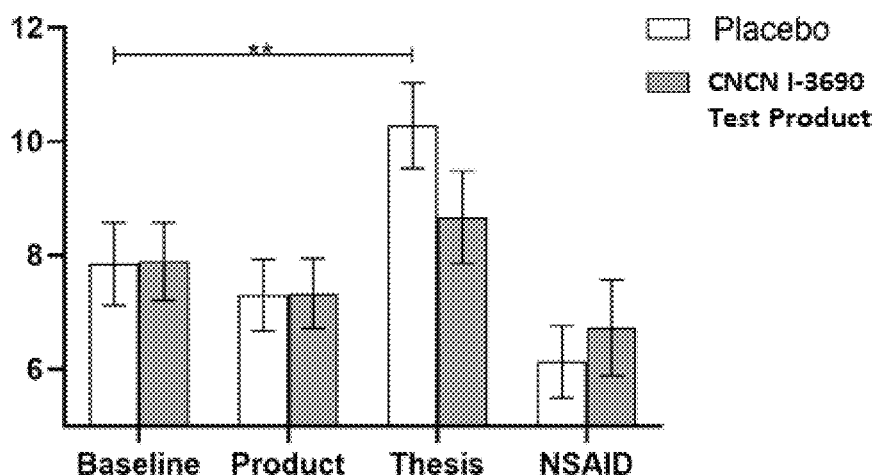
FIG. 6. PSS of study groups having high cortisol (>P90).

As shown in FIG. 6, PSS increased during stress vs. baseline for placebo (Δ=3, 95% CI [0.9;5.1], p=0.006) but not CNCM I-3690 test product groups, a lower increase during stress vs. baseline was observed in CNCM I-3690 test product vs. placebo (Δ=−3.6, 95% CI [−6.4;−0.8], p=0.01) groups.

Figure 7:
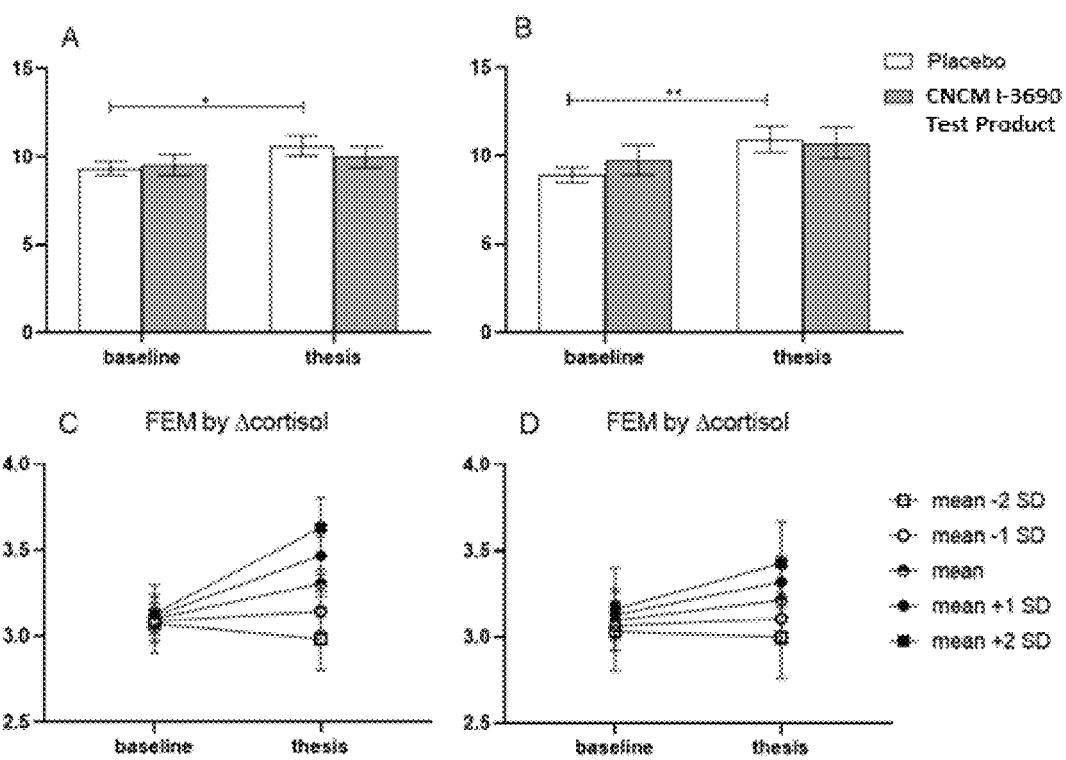
FIG. 7. Stress-induced increase in the fractional excretion of mannitol in the intention-to-treat (A) and subgroup analysis of subjects with cortisol >P90 during stress (B). Mediation analysis with estimates at baseline and during stress for different levels of the stress-induced change in cortisol with the placebo (C) and CNCM I-3690 test product (D) treatment. Legend: *$p<0.05$, **$p<0.01$.

The stress-induced increase in FEM and PSS with placebo was more pronounced in the subgroup analysis (cortisol >P90), with a significant between-treatment difference for PSS (see supplementary results). The stress-induced increase in FEM (FIGS. 7 A & B) and PSS (FIGS. 8 A & B) is illustrated for the intention-to-treat and subgroup analyses.

Figure 8:
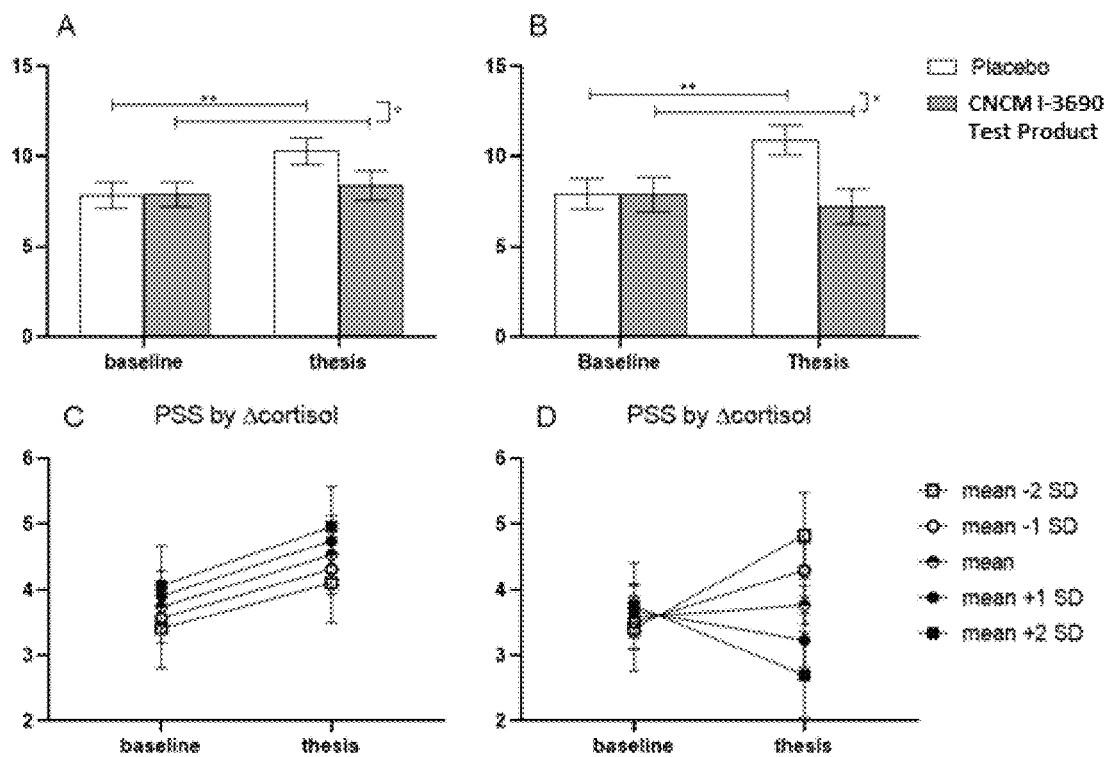
FIG. 8. Stress-induced increase in the perceived stress scale in the intention-to-treat (A) and subgroup analysis of subjects with salivary cortisol >P90 during stress (B). Mediation analysis with estimates at baseline and during stress for different levels of the stress-induced change in cortisol with the placebo (C) and CNCM I-3690 test product (D) treatment. Legend: *$p<0.1$, *$p<0.05$, **$p<0.01$.

It was hypothesized that the CNCM I-3690 effects on subjective stress and mannitol excretion described above were dependent on the level of HPA-axis activation. Therefore, the mediating effect of cortisol was tested by adding the standardized stress-induced change in cortisol (Δcortisol) in the model for FEM and PSS. The stress-induced increase in FEM was only found in subjects with average or higher changes in cortisol with the placebo but not CNCM I-3690 test product (FIGS. 7 C & D), which is in line with the subgroup analysis in subjects with stress-induced cortisol >P90 of baseline. While no mediation was found for PSS with the placebo, a stress-induced increase in PSS was only found in subjects with below average changes in cortisol with the CNCM I-3690 test product, indicating a lack of preventative effect with limited HPA-axis activation (FIGS. 8 C & D).

No serious adverse events occurred.

CONCLUSION

Despite L. rhamnosus CNCM I-3690 did not alter the intestinal permeability, quantified by the LMR, during psychological stress, L. rhamnosus CNCM I-3690 seems to prevent stress-induced hyperpermeability to mannitol, a pathway that differs from NSAID-induced hyperpermeability to lactulose. Subjective stress-markers were reduced with L. rhamnosus vs. placebo, suggesting gut-mediated effects.

The invention claimed is:

1. A method for amelioration or treatment of anxiety and/or psychological stress in a human in need thereof comprising administering an effective amount of L. rhamnosus CNCM I-3690 or a composition comprising an effective amount of L. rhamnosus CNCM I-3690, to the human.

2. The method of claim 1, wherein the composition is a pharmaceutical composition, a nutraceutical composition, a dietary supplement, a probiotic supplement or a nutritional composition.

3. The method of claim 1, wherein the composition comprises at least $10^6$ colony forming unit (CFU) of L. rhamnosus CNCM 1-3690 per gram (g).

4. The method of claim 1, wherein the composition is consumed at a dose comprising between about $10^8$ and about $10^{14}$ colony forming unit (CFU) of L. rhamnosus CNCM I-3690.

5. The method of claim 4, wherein at least 1, 2, 3, or 4 doses are provided within a 24 hour time period.

6. The method of claim 1, wherein the composition is consumed at least 1 week in advance of a stress-inducing event.

7. The method of claim 1, wherein the human has above-normal or excessive levels of cortisol, anxiety and/or psychological stress.

8. The method of claim 1, wherein the stress is self-perceived psychological stress.

\* \* \* \* \*